(12) United States Patent
Takahashi et al.

(10) Patent No.: US 7,423,357 B2
(45) Date of Patent: Sep. 9, 2008

(54) ELECTRIC ROTATING MACHINE

(75) Inventors: Masakatsu Takahashi, Numazu (JP); Hiroshi Kanazawa, Hitachi (JP)

(73) Assignee: Kokussan Denki Co., Ltd., Namazu-Shi (JP)

( * ) Notice: Subject to any disclaimer, the term of this patent is extended or adjusted under 35 U.S.C. 154(b) by 0 days.

(21) Appl. No.: 11/515,593

(22) Filed: Sep. 5, 2006

(65) Prior Publication Data
US 2007/0090708 A1  Apr. 26, 2007

(30) Foreign Application Priority Data
Sep. 5, 2005  (JP) ............... 2005-256388

(51) Int. Cl.
*H02K 21/12* (2006.01)
(52) U.S. Cl. .................. 310/156.14; 310/156.21
(58) Field of Classification Search .............. 310/216, 310/156.21, 67 R, 156.08, 156.12, 156.14, 310/156.26
See application file for complete search history.

(56) References Cited

U.S. PATENT DOCUMENTS

| | | | | |
|---|---|---|---|---|
| 3,590,294 A | * | 6/1971 | Inagaki et al. ............ | 310/92 |
| 4,146,805 A | * | 3/1979 | Fehr et al. ............... | 310/104 |
| 4,751,417 A | * | 6/1988 | Krinickas et al. ........ | 310/211 |
| 5,345,133 A | * | 9/1994 | Satake ..................... | 310/266 |
| 5,500,994 A | * | 3/1996 | Itaya ....................... | 29/598 |
| 5,744,887 A | * | 4/1998 | Itoh ........................ | 310/156.28 |
| 6,501,616 B1 | * | 12/2002 | Neal ....................... | 360/99.08 |
| 2004/0239208 A1 | * | 12/2004 | Ren et al. ................ | 310/261 |

FOREIGN PATENT DOCUMENTS

| | | | | |
|---|---|---|---|---|
| JP | 06078483 A | * | 3/1994 | |
| JP | 08023649 A | * | 1/1996 | |
| JP | 2004-260951 | | 9/2004 | |
| JP | 2006025552 A | * | 1/2006 | |

* cited by examiner

*Primary Examiner*—Dang D Le
(74) *Attorney, Agent, or Firm*—Pearne & Gordon LLP

(57) ABSTRACT

An electric rotating machine which comprises: a magnet rotor which has a rotor yoke having a magnetic attachment surface extending in a peripheral direction, and multiple permanent magnets for constituting a magnetic field which are intermittently arranged in the peripheral direction of the rotor yoke and are attached on the magnetic attachment surface; and a stator in which armature coils are wound around an armature core having a magnetic pole portions opposed to magnetic poles of the magnet rotor, wherein a large number of grooves which extend in the peripheral direction of the rotor yoke are provided on the magnet attachment surface of the rotor yoke.

5 Claims, 3 Drawing Sheets

ELECTRIC ROTATING MACHINE

TECHNICAL FIELD OF THE INVENTION

This invention relates to an electric rotating machine which comprises: a magnet rotor having a rotor yoke and magnets attached to the rotor yoke; and a stator having an armature core and an armature coil or coils wound around the armature core.

BACKGROUND OF THE INVENTION

An electric rotating machine such as a magneto generator and a brushless motor is constituted by: a magnetic rotor which has a rotor yoke having a magnet attachment surface, and a plurality of permanent magnets attached on the magnet attachment surface of the rotor yoke for constituting a magnetic field; and a stator which has an armature core having magnetic pole portions opposed to magnetic poles of the magnet rotor, and an armature coil or coils which are wound around the armature core.

In such an electric rotating machine, since a magnetic flux interlinking with the rotor yoke is changed along with a rotation of the magnet rotor, eddy-currents flow on a surface of the rotor yoke, and the eddy-currents and an electric resistance of the rotor yoke cause a generation of an eddy-current loss. The eddy-current loss will cause not only a reduction of efficiency of the electric rotating machine, but also an increase of temperature of the rotor. Therefore, when the eddy-current loss is large, an output of the electric rotating machine is limited. Thus, it is preferable to reduce the eddy-current loss as much as possible.

In order to reduce the eddy-current loss, a rotor having a rotor yoke formed by a stack of silica steel boards may be used. However, such a rotor is not generally used since it is not easy to form the rotor yoke of the electric rotating machine with the stack of silica-steel boards.

For reducing the eddy-current loss of the electric rotating machine which has a rotor including a magnetic field, it is known that a large number of grooves are formed on a magnetic pole surface of each permanent magnet as shown in Japanese Patent Application Laid-Open Publication No. 2004-260951.

In case that a large number of grooves are formed on a magnetic pole surface of each permanent magnet, the magnet becomes weak, and the magnet may be easily damaged. In an invention disclosed in Japanese Patent Application Laid-Open Publication No. 2004-260951, the strength of the magnet is prevented from decreasing by coating the magnetic pole surface of each magnet having grooves with resin. However, if the magnet is coated with resin, the process for coating the magnet requires preparations of resin for coating and much time and labor for manufacturing the rotor; therefore, increase in manufacturing cost is unavoidable. Also, if the magnetic pole surface of the permanent magnet is coated with resin, there is a great possibility that the performance of the electric rotating machine may be reduced since a gap between each magnetic pole of the magnet rotor and each magnetic pole portion of an armature core becomes larger for the thickness of the resin coating.

SUMMARY OF THE INVENTION

Accordingly, it is an object of the invention to provide an electric rotating machine which is able to reduce an eddy-current loss, improve efficiency and increase an output, without reducing strength of a magnet and increasing a manufacturing cost.

The present invention is applied to an electric rotating machine comprising: a magnet rotor which has a rotor yoke comprising a magnet attachment surface with a portion used for attaching magnets, and a plurality of permanent magnets for constituting a magnetic field which are intermittently arranged and are attached on the magnet attachment surface of the rotor yoke; and a stator which has an armature core including magnetic pole portions opposed to magnetic poles of the magnet rotor and an armature coil or coils wound around the armature core.

In the present invention, there are formed, on at least a part of the magnet attachment surface of the rotor yoke, a large number of grooves across loops of eddy-currents flowing on the magnet attachment surface.

When there are formed, on at least a part of the magnet attachment surface, a large number of grooves across the loops of the eddy-currents flowing on the magnet attachment surface as stated above, the loops of the eddy-currents are interrupted by the grooves. Thus, electric resistance against the eddy-currents is increased, and the eddy-currents are limited. Since the eddy-current loss is determined by the product of a square value of the eddy current and the electric resistance, an amount of the eddy current loss can be reduced significantly by limiting the eddy-currents. Also, since it is unnecessary to form grooves on the magnetic pole surface of the magnet, the eddy current loss can be reduced to obtain high efficiency and high output without decreasing the strength of the magnet and increasing the manufacturing cost.

Generally, the magnet attachment surface is provided so as to extend in the peripheral direction of the rotor yoke, and a plurality of the permanent magnets are arranged intermittently in the peripheral direction of the rotor yoke and are attached on the magnet attachment surface. In this case, it is preferable that the grooves interrupting the eddy-current loops are provided so as to extend in the peripheral direction of the rotor yoke and that the large number of grooves are formed to be arranged in an axial direction of the rotor yoke.

As aforementioned, when the grooves are provided so as to extend in the peripheral direction of the rotor yoke, the grooves can be formed easily by cutting a part of the magnet attachment surface while rotating the rotor yoke. Therefore, a process for forming the grooves on the magnet attachment surface can be easily performed.

The grooves interrupting the eddy-current loops are not necessarily needed to be formed so as to extend in the peripheral direction of the rotor yoke, and it may be formed so as to extend in the axial direction of the rotor of the rotor yoke or in a direction inclined relative to the axial direction. In case that the rotor yoke is manufactured by casting, the grooves interrupting the eddy-current loops can be formed at the same time when casting is performed. In this case, it is preferable to provide each groove so as to extend in the axial direction of the rotor yoke, in order to make a separation of a mold for casting easier to be performed.

For controlling the eddy-currents effectively, it is preferred to provide the large number of grooves so as to spread entirely over at least a portion deviated from the permanent magnet on the magnet attachment surface.

The present invention can be applied to an outer-rotor type electric rotating machine in which the rotor rotates at outside of the stator and to an inner-rotor type electric rotating machine in which the rotor rotates at inside of the stator. Generally, the rotor yoke is formed into a cup-like shape in the outer-rotor type electric rotating machine. When the rotor yoke is formed into a cup-like shape, an inner peripheral surface of a peripheral wall portion of the rotor yoke becomes a magnet attachment surface.

In the inner-rotor type electric rotating machine, the rotor yoke is formed into a cylindrical shape, and an outer peripheral surface of the peripheral wall portion of the rotor yoke becomes a magnet attachment surface.

In a preferred embodiment of the invention, a portion on which each permanent magnet is arranged is formed flat, and each permanent magnet is adhesively fixed to the flat portion on the magnet attachment surface.

The attachment strength of the magnets can be increased when the portion on which each magnet is arranged is formed flat, instead of providing the grooves entirely over the magnet attachment surface.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF PREFERRED EMBODIMENTS

Figure 1:
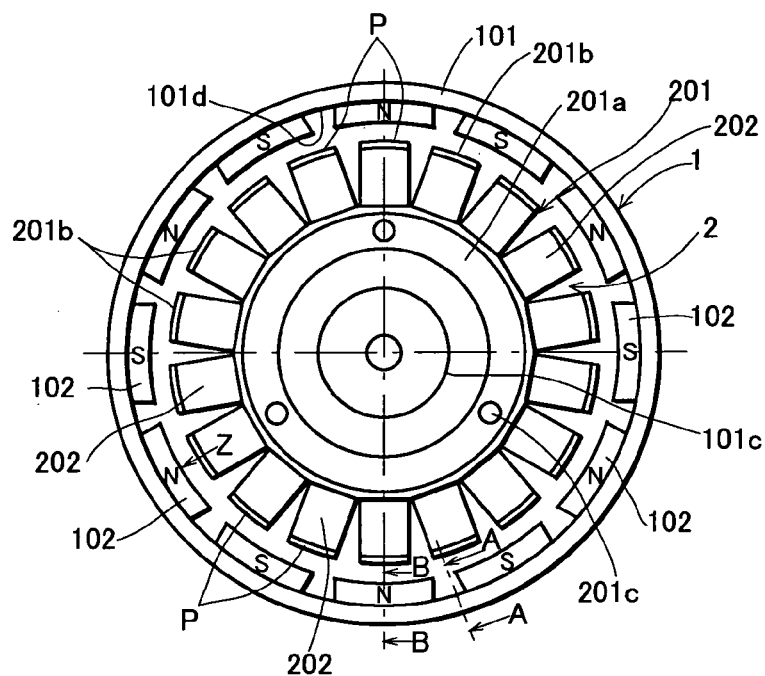
FIG. 1 is a front view showing a construction of an electric rotating machine in accordance with one embodiment of the invention.
Figure 2:
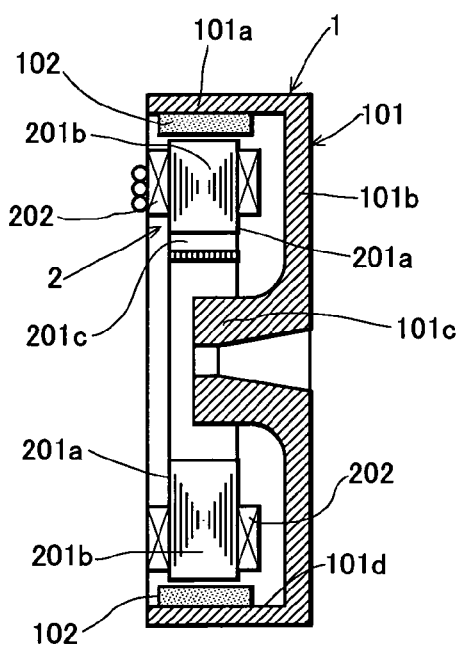
FIG. 2 is a vertical cross sectional view of the electric rotating machine of FIG. 1.

FIGS. 1 and 2 show an example of construction of an outer-rotor type electric rotating machine such as a flywheel magneto generator. In FIGS. 1 and 2, a reference numeral 1 denotes a magnet rotor, and 2 denotes a stator. The magnet rotor 1 comprises a rotor yoke 101 and permanent magnets 102, 102, . . . mounted on the rotor yoke 101.

The rotor yoke 101 is formed into almost cup-like shape with ferromagnetic materials such as iron and includes in one body a peripheral wall portion 101a which is cylindrically formed and a bottom wall portion 101b which is provided so as to close an axial one end of the peripheral wall portion 101a. In a central portion of the bottom wall portion 101b of the rotor yoke, a boss 101c is provided. A rotational axis not shown is attached to the magnet rotor 1 by fitting the boss 101c into the rotational axis to fix the boss relative to the rotational axis.

In this example, an inner peripheral surface of the peripheral wall portion 101a of the rotor yoke 101 is a magnet attachment surface 101d extending in a peripheral direction of the rotor yoke. On the magnet attachment surface, there are attached a plurality of arc-shaped permanent magnets 102 intermittently arranged in the peripheral direction of the rotor yoke.

In this embodiment, there are provided twelve permanent magnets 102, which are arranged with same angular intervals and are adhered to the magnet attachment surface 101d. The permanent magnets 102 are magnetized to radial direction of the rotor yoke so that magnetic poles with different polarity of magnetization are arranged alternately in the peripheral direction of the rotor yoke. The rotor yoke 101 and twelve permanent magnets 102 constitute the magnet rotor 1 having twelve magnetic poles.

In this specification, "the magnet attachment surface" means a surface a part of which is used for attaching magnets. The surface includes not only a surface where is actually in contact with the magnets in order to attach the magnets, but also a surface being exposed without being hidden by the magnets. A portion not used for attaching the magnets (a non-contact portion with the magnets) is faced to the magnetic poles of the stator without being hidden by the magnets.

The stator 2 comprises: an armature core 201 which consists of a stack of steel plates being stamped out in a predetermined pattern and has a structure that eighteen salient pole portions 201b, 201b, . . . are radially protruded from an annular yoke 201a; and armature coils 202, 202, . . . wound around the salient pole portions 201b, 201b, . . . of the armature core 201, respectively. In this stator 2, tip portions of each salient pole portion 201b of the armature core 201 are magnetic pole portions P which are faced to the magnetic poles of the magnet rotor 1 through predetermined gaps. The armature core 201 and the armature coils 202 constitute the stator 2 having eighteen poles. The stator 2 is secured to a stator mounting portion by unshown bolts, which are inserted to mounting holes 201c formed on the annular yoke 201a of the armature core 201, and screwed in screw holes which are provided on the stator mounting portion.

In this type of the electric rotating machine, since a magnetic flux which is led out from each permanent magnet 102 and interlinks with the magnet attachment surface 101d alternates along with a rotation of the magnet rotor 1 when the magnet rotor 1 rotates, eddy-currents flow through the magnet attachment surface 101d, and an eddy current loss is generated. The eddy current loss is determined by the product of a square value of the eddy current and an electric resistance of a circuit where the eddy-currents flow.

In the present invention, in order to reduce the eddy current loss, there are provided in parallel a large number of grooves, which interrupt loops of the eddy-currents flowing on the magnet attachment surface 101d. The grooves are provided at least on a part of the magnet attachment surface 101d, preferably at a portion deviated from the permanent magnet 102 (an exposed portion without contacting to each permanent magnet). Although there are innumerable small loops and a large loop which surrounds each permanent magnet 102 as the eddy-current loop, a large number of grooves are formed on the magnet attachment surface 110d at least so as to cross a large loop L (in FIG. 4) of the eddy-currents surrounding the magnets, to intercept the large loop of the eddy-currents by the large number of grooves. Thus, in case of forming the grooves across the large loop of the eddy-currents, the small loops of the eddy-currents are also intercepted by the grooves as a natural consequence.

In this embodiment, there are formed, on the magnet attachment surface 101d, a large number of grooves g, g, . . . each of which extends in the peripheral direction of the rotor yoke 101. The grooves are provided at least on a portion of the magnet attachment surface 101d deviated from each permanent magnet 102 and the grooves are arranged in the axial direction of the rotor yoke 101 as shown in FIGS. 3 and 4.

Figure 3:
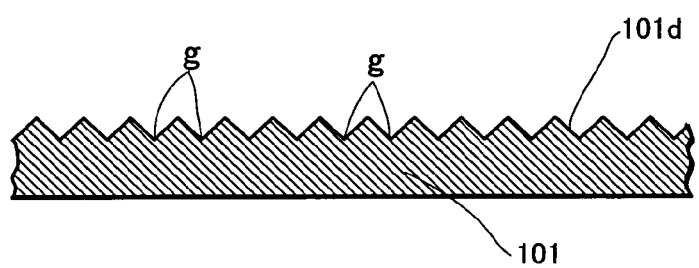
FIG. 3 is a cross sectional view of a magnet rotor taken along the line A-A of FIG. 1.
Figure 4:
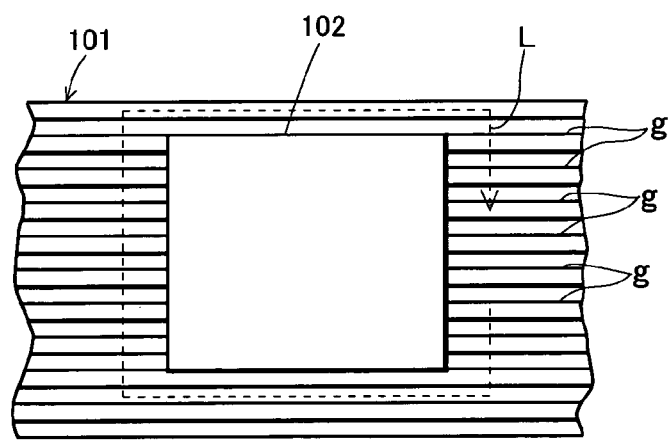
FIG. 4 is an extend elevational view showing a part of the magnet rotor of the electric rotating machine of FIG. 1.

FIG. 3 is a cross sectional view taken along the line III-III of FIG. 1, and FIG. 4 is an extend elevational view showing a part of the magnet rotor of the electric rotating machine of FIG. 1.

Each groove g extending in the peripheral direction of the rotor yoke can be formed easily by machining with a cutting tool each portion, where each groove g should be formed, on the inner peripheral surface of the rotor yoke, while rotating the rotor yoke 101 round a central axis of the rotor yoke. It is preferable that the grooves g are distributed evenly at least over the part of the magnet attachment surface 110*d* deviated from the permanent magnet.

In this embodiment, each grooves g is formed so as to cross the large loop L of the eddy-currents surrounding the magnet 102. In this way, when a large number of grooves g across the loop L of the eddy-currents surrounding the magnet are formed at lease at the portion deviated from the permanent magnet on the magnet attachment surface, it is possible to limit the eddy-currents flowing along with the rotation of the magnet rotor, since the electric resistance of the loop can be large by extending effective length of the loop in which the eddy-currents flow. Therefore, an increase of the temperature of the rotor caused by the eddy-current loss can be prevented, and also the electric power loss generated in the electric rotating machine can be reduced.

In case of providing the grooves g all over the magnetic attachment surface, there is a danger of decreasing the attachment strength of the magnet when the magnet is attached by adhesion since a contacting area of each permanent magnet and the magnet attachment surface decreases. Thus, it is preferred that the grooves g are provided at the portion deviated from the portion where permanent magnets are arranged.

Figure 5:
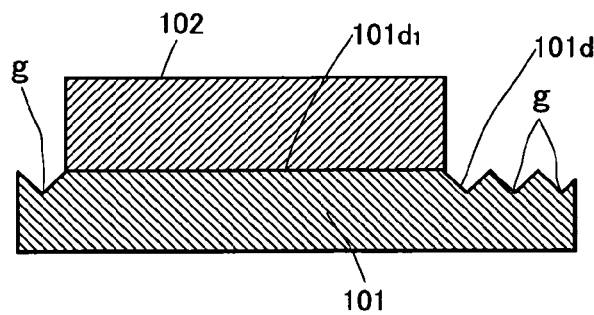
FIG. 5 is a cross sectional view of the magnet rotor taken along the line B-B of FIG. 1.

FIG. 5 shows an embodiment of the present invention in which the grooves g are provided avoiding the portion where each permanent magnet is arranged (the grooves are provided on the portion deviated from the permanent magnet) and the portion where each permanent magnet 102 is arranged is regarded as a flat surface 101*d*1. When the surface of the portion where each permanent magnet is attached is flat, the contacting area of the magnet and magnet attachment surface increases to increase adhesive strength of the magnet in case of fixing the magnet 102 by adhesion; thus the possibility that the attachment strength of the magnet becomes insufficient can be avoided.

When the portion of the magnet attachment surface 101*d* on which each permanent magnet is attached is formed flat, the grooves g may be provided avoiding the portion being formed flat. But preferably, each groove g is formed so as to extend all over the magnet attachment surface (all over the peripheral direction of the rotor yoke) to make the process of machining the grooves g easier.

Figure 6:
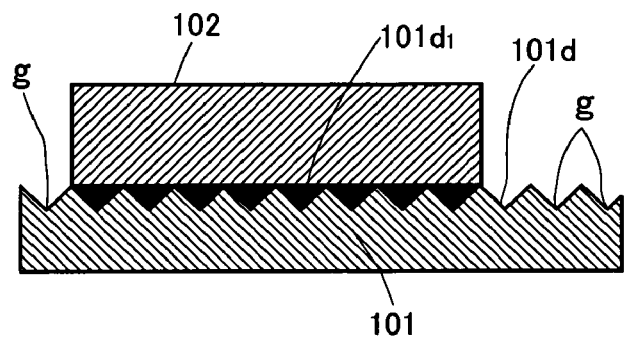
FIG. 6 is a cross sectional view similar to FIG. 5, but constructed in accordance with another embodiment of the invention.

Therefore, when the portion where each permanent magnet is attached is formed flat, it is preferred that the flat surface 101*d*1 is formed by filling up the grooves at the portion where the magnet 102 is attached with metal or resin as shown in FIG. 6, after a series of the grooves g are formed so as to extend all aver the magnet attachment surface of the rotor yoke.

Figure 7:
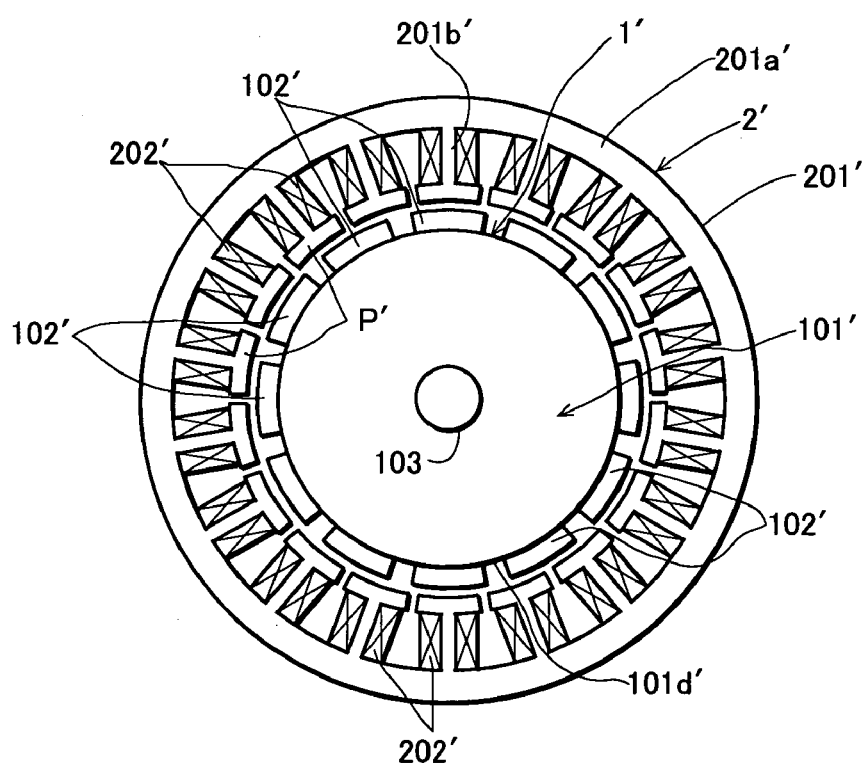
FIG. 7 is a front view showing a construction of an electric rotating machine in accordance with another embodiment of the invention.

Although, in the above-illustrated embodiment, the invention is applied to the electric rotating machine using the outer-rotor type magnet rotor as an example, it may be applied to an electric rotating machine using an inner-rotor type magnet rotor. FIG. 7 shows an example of an electric rotating machine constituting an inner-rotor type magnet rotor. In this drawing, a reference numeral 1' denotes an inner-rotor type magnet rotor, and 2' denotes a stator.

The inner-rotor type magnet rotor 1' shown in FIG. 7 comprises a rotor yoke 101' and permanent magnets 102', 101', . . . mounted on the rotor yoke 101'. In the shown example, an outer peripheral surface of the rotor yoke 101' is a magnet attachment surface 101*d*'onto which the permanent magnets 102' are attached, for example, by adhesion. The rotor yoke 101' and the permanent magnets 102' constitute the inner-rotor type magnet rotor 1' having twelve poles. At an axial core portion of the rotor yoke 101', a rotational axis 103 is mounted.

The stator 2' comprises: an armature core 201' which consists of a laminated body made of steel plates being stamped out in a predetermined pattern and has a structure that eighteen salient pole portions 201*b*', 201*b*', . . . are radially protruded from an annular yoke 201*a*'; and armature coils 202', 202', . . . wound around the salient pole portions 201*b*', 201*b*', . . . of the armature core 201', respectively. The armature core 201' and the armature coils 202' constitute the stator 2' having eighteen poles, and the magnet rotor 1' is arranged inside of the stator 2' concentrically with the stator. In this stator 2', tip portions of each salient pole portion 201*b*'of the armature core 201' are magnetic pole portions P' which are faced to the magnetic poles of the magnet rotor 1' through predetermined gaps.

In case of using such an inner-rotor type magnet rotor, it is possible to reduce an eddy current loss by forming a large number of grooves across loops of eddy-currents on the magnet attachment surface 101*d*'on an outer periphery of the rotor yoke 101'.

As shown in FIGS. 3 and 4, when a large number of grooves g are provided so as to extend in a peripheral direction of the rotor yoke, a process for forming the grooves can be easily performed since each groove can be formed by cutting a part of the magnet attachment surface while rotating the rotor yoke. However, the grooves across the eddy current loop are not necessarily formed so as to extend in the peripheral direction of the rotor yoke, and these may be formed so as to extend in an axial direction or a direction inclined relative to the axial direction.

The rotor yoke may be cast or press-formed. In case of manufacturing the rotor yoke by cast, the grooves across the eddy current loop are formed at the same time the casting is performed. In this case, providing each groove so as to extend in the axial direction of the rotor yoke is preferred in order to make a separation of a mold for casting easier.

As aforementioned, according to the present invention, since a large number of grooves across the eddy current loop which flows on the magnet attachment surface are formed at least on a part of the magnet attachment surface, an electric resistance of the magnet attachment surface can be increased relative to eddy-currents to limit the eddy-currents, and thus a increase in temperature of the rotor caused by the eddy current loss can be controlled. Also, since an electric loss caused in the electric rotating machine can be decreased, a high output and a high efficiency of the electric rotating machine can be accomplished.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An electric rotating machine comprising: a magnet rotor which has a rotor yoke formed with ferromagnetic materials and comprising a magnet attachment surface extending in a peripheral direction, and a plurality of permanent magnets for constituting a magnetic field which are intermittently arranged in the peripheral direction of said rotor yoke and are attached on said magnet attachment surface; and a stator which has an armature core including magnetic pole portions opposed to magnetic poles of said magnet rotor and an armature coil or coils wound around said armature core, wherein:

a series of grooves each of which has a v-shaped section and extends around a peripheral surface of said rotor yoke is provided on said magnet attachment surface of the rotor yoke, said grooves being arranged in an axial direction of said rotor yoke without having spaces therebetween, a flat surface is formed on said magnet attachment surface by filling up the grooves with metal or resin at a portion where each permanent magnet is supposed to be attached to attach each magnet to each flat surface.

2. An electric rotating machine as set forth in claim 1 and wherein said rotor yoke is formed into a cylindrical shape, and an outer peripheral surface of the rotor yoke is said magnet attachment surface.

3. An electric rotating machine as set forth in claim 2 and wherein said rotor yoke is formed into a cup-like shape, and an inner peripheral surface of a peripheral wall portion of the rotor yoke is said magnet attachment surface.

4. An electric rotating machine as set forth in claim 2 and wherein said rotor yoke is formed into a cylindrical shape, and an outer peripheral surface of the rotor yoke is said magnet attachment surface.

5. An electric rotating machine as set forth in claim 1 and wherein said rotor yoke is formed into a cylindrical shape, and an outer peripheral surface of the rotor yoke is said magnet attachment surface.

* * * * *